(No Model.)

H. P. WEALE.
AUTOMATIC METALLIC PACKING.

No. 275,299. Patented Apr. 3, 1883.

WITNESSES:

INVENTOR:
H. P. Weale by
H. W. Beadle & Co.
attys.

UNITED STATES PATENT OFFICE.

HENRY P. WEALE, OF BOSTON, MASSACHUSETTS, ASSIGNOR TO HIMSELF, AND M. V. B. HERSOM, OF SAME PLACE, AND T. G. ABBOTT, OF WATERTOWN, MASSACHUSETTS.

AUTOMATIC METALLIC PACKING.

SPECIFICATION forming part of Letters Patent No. 275,299, dated April 3, 1883.

Application filed January 31, 1883. (No model.)

*To all whom it may concern:*

Be it known that I, HENRY P. WEALE, of Boston, in the county of Suffolk and State of Massachusetts, have invented certain Improvements in Automatic Metallic Packing for Locomotives and Stationary Engines, of which the following is a specification.

This invention relates to that class of metallic packing for piston-rods, valve-stems, &c., in which a series of tapering rings or sections of soft metal, placed end to end, are forced by the pressure of the gland into a conical or tapering shell or holder inserted in the stuffing-box.

My invention has for its object to prevent leakage between the proximate ends of said sections, and to provide means for preventing the sections from being displaced in the event of the accidental loosening of the gland, all of which I will now proceed to describe and claim.

Figure 1:
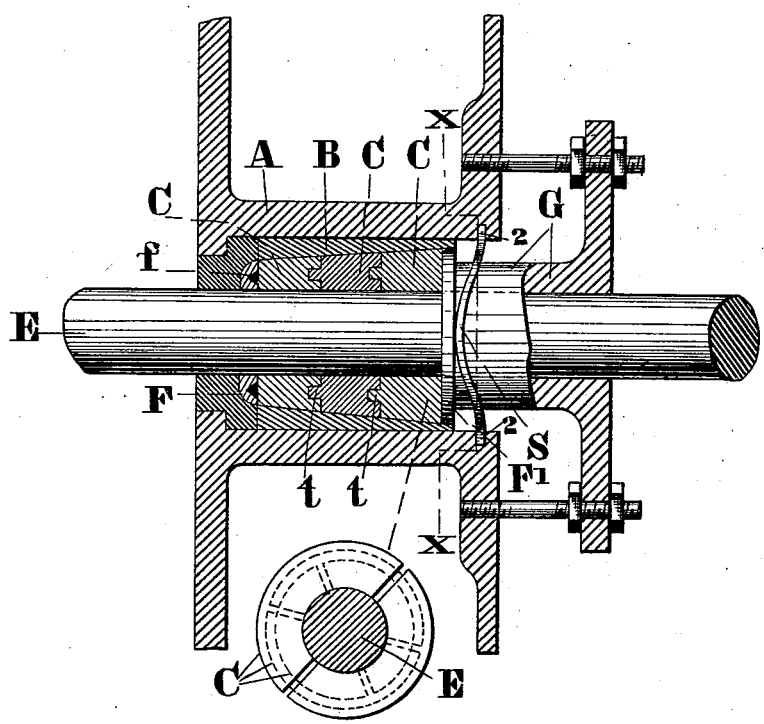
Figure 2:
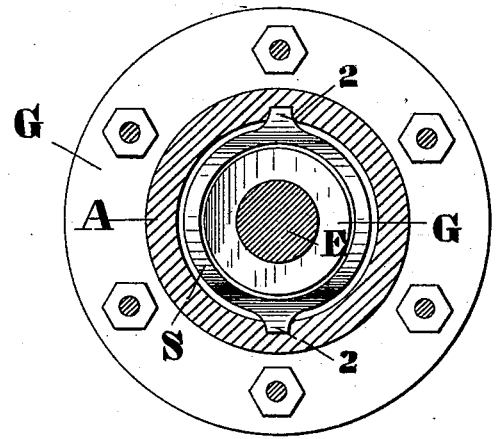

Of the accompanying drawings, forming a part of this specification, Figure 1 represents a longitudinal vertical section of a stuffing-box provided with my improvement. Fig. 2 represents a section on line $x\ x$, Fig. 1, looking toward the gland of the stuffing-box.

The same letters of reference indicate the same parts in all the figures.

In the drawings, A represents a stuffing-box, having inserted in its bore a shell, B, which is of uniform diameter externally from end to end, but is provided with a bore which tapers inwardly from the outer to the inner end of the stuffing-box.

C C C represent a series of packing-rings of soft metal, preferably three in number, each tapered externally, so that the three, when properly placed end to end, will fit the tapering bore of the shell B. The rings C are split lengthwise, so as to be capable of compression against the rod E. The proximate ends of the rings are tongued and grooved, as shown at $t$, to make steam-tight joints. This feature—viz., the tonguing and grooving of the ends of the sections—constitutes one portion of my improvement.

F F' represent rings of composition metal, harder than the metal of the packing-rings C, and placed the one at the inner and the other at the outer end of the series of packing-rings. The inner ring, F, bears against the inner end of the packing-cavity formed in the stuffing-box, and the outer ring, F', is interposed between the outer packing-ring and the gland G. Said rings F F' prevent the ends of the inner and outer packing-rings from being upset by the pressure of the gland, and they constitute another part of my improvement. The inner ring, F, is provided with a groove, $f$, in the side which abuts against the inner packing-ring. When extreme endwise pressure is applied to the packing-rings the groove $f$ enables the thinner end of the packing-ring bearing against it to fill said groove with metal, which, were it not for said groove, would be displaced outwardly, and thus upset the end of the packing-ring.

Another part of my improvement is a semi-elliptic spring, S, which is engaged with indentations formed in the bore of the stuffing-box A. The spring is of annular form, and has offsets 2 2, adapted to enter said indentations. The spring presses inwardly against the outer ring, F', and the series of packing-rings, and prevents said rings from being displaced outwardly in case the gland becomes accidentally loosened by the loosening or loss of the nuts on the bolts that secure the gland to the stuffing-box. The spring is of such size that the end of the gland can project through its central orifice and bear against the ring F'. The packing-rings are so placed in the shell that their longitudinal seams alternate or break joints.

It will be seen that the inward pressure exerted on the tapering packing-rings compresses them firmly against the rod, and thus insures a steam-tight joint.

I claim—

1. The combination, in a stuffing-box, of the internally-tapered shell, the series of tapered packing-rings C, and the composition rings F F' at the ends of the series of packing-rings, the ring F having the groove $f$, and the ring F' being interposed between the outer packing-ring and the gland, substantially as and for the purposes specified.

2. The combination, with the series of packing-rings normally held in position by the fixed gland, of the semi-elliptic spring S, engaged with indentations in the stuffing-box, and adapted to prevent displacement of said rings in case of the accidental loosening of the gland, as set forth.

In testimony whereof I have signed my name to this specification, in the presence of two subscribing witnesses, this 22d day of January, 1883.

HENRY P. WEALE.

Witnesses:
M. V. B. HERSOM,
A. L. WHITE.